US012014355B1

(12) United States Patent
Yang (10) Patent No.: US 12,014,355 B1
(45) Date of Patent: Jun. 18, 2024

(54) SYSTEMS AND METHODS FOR DIGITAL PIN PROMPTING AND SETTING (71) Applicant: Wells Fargo Bank N.A., San Francisco, CA (US)

(72) Inventor: Young M. Yang, San Francisco, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 0 days.

(21) Appl. No.: 18/074,241

(22) Filed: Dec. 2, 2022

(51) Int. Cl.
G06Q 20/00 (2012.01)
G06Q 20/34 (2012.01)
G06Q 20/40 (2012.01)

(52) U.S. Cl.
CPC ..... *G06Q 20/3558* (2013.01); *G06Q 20/4012* (2013.01)

(58) Field of Classification Search
CPC .................................................. G06Q 20/3558
USPC ............................................................ 705/41
See application file for complete search history.

(56) References Cited

U.S. PATENT DOCUMENTS

| 9,760,871 | B1 * | 9/2017 | Pourfallah | G06Q 10/10 |
| 2013/0275308 | A1 * | 10/2013 | Paraskeva | G06Q 20/3224 |
| | | | | 705/44 |
| 2016/0253652 | A1 * | 9/2016 | Je | G06Q 20/382 |
| | | | | 705/39 |
| 2017/0161781 | A1 * | 6/2017 | Parekh | G06Q 20/351 |

OTHER PUBLICATIONS

Single Sign-On to the Web with an EMV Card David J. Boyd Information Security Group, Royal Holloway, University of London, Egham, Surrey, TW20 0EX, United Kingdom (Year: 2008).*
Improving banking authentication using hybrid cryptographic technique Published in: 2015 International Conference on Computer, Communication and Control (IC4) (pp. 1-7) Authors: Sant Kumar Choubey • Arpit Agarwa (Year: 2015).*

* cited by examiner

*Primary Examiner* — Bruce I Ebersman
*Assistant Examiner* — John A Anderson
(74) *Attorney, Agent, or Firm* — Foley & Lardner LLP (57) ABSTRACT

A provider computing system includes one or more processing circuits including one or more processors and one or more memories having instructions stored thereon that, when executed by the one or more processors, cause the one or more processors to: receive a new card action from a customer, the new card action prompting a provider to send a new card to the customer; determine that a personal identification number (PIN) has not been set for the new card; determine whether the customer is registered for online access for an account associated with the new card; in response to determining that the customer is registered for the online access, perform an online-based PIN process to set the PIN; and in response to determining that the customer is not registered for the online access, perform a call-based PIN process to set the PIN.

14 Claims, 4 Drawing Sheets

SYSTEMS AND METHODS FOR DIGITAL PIN PROMPTING AND SETTING

TECHNICAL FIELD

The present disclosure relates to systems and methods for proactively prompting and digitally setting personal identification numbers (PINs) associated with payment cards.

BACKGROUND

Customers use bankcards such as debit cards for a variety of transactions associated with customer financial accounts. Typically, bankcards have an expiration date, after which the bankcard expires and may no longer be used by the customer when performing transactions. In some instances, upon the expiration of a debit card or upon opening of a new deposit account (e.g., a checking account), a new debit card may be mailed to a customer.

SUMMARY

One embodiment relates to a provider computing system comprising one or more processing circuits including one or more processors and one or more memories having instructions stored thereon that, when executed by the one or more processors, cause the one or more processors to receive a new card action from a customer, the new card action prompting the provider to send a new card to the customer. The instructions, when executed by the one or more processors, further cause the one or more processors to determine that a personal identification number (PIN) has not been set for the new card. The instructions, when executed by the one or more processors, further cause the one or more processors to determine whether the customer is registered for online access for an account associated with the new card. The instructions, when executed by the one or more processors, further cause the one or more processors to, in response to determining that the customer is registered for the online access, perform an online-based PIN process to set the PIN. The instructions, when executed by the one or more processors, further cause the one or more processors to, in response to determining that the customer is not registered for the online access, perform a call-based PIN process to set the PIN.

Another embodiment relates to a computer-implemented method. The computer-implemented method comprises receiving, by a provider computing system associated with a provider, a new card action from a customer, the new card action prompting the provider to send a new card to the customer. The computer-implemented method further comprises determining, by the provider computing system, that a personal identification number (PIN) has not been set for the new card. The computer-implemented method further comprises determining, by the provider computing system, that the customer is registered for online access for an account associated with the new card. The computer-implemented method further comprises, in response to determining that the customer is registered for the online access, perform an online-based PIN process to set the PIN.

Still another embodiment relates to another computer-implemented method. The computer-implemented method comprises receiving, by a provider computing system associated with a provider, a new card action from a customer, the new card action prompting the provider to send a new card to the customer. The computer-implemented method further comprises determining, by the provider computing system, that a personal identification number (PIN) has not been set for the new card. The computer-implemented method further comprises determining, by the provider computing system, that the customer is not registered for online access for an account associated with the new card. The computer-implemented method further comprises, in response to determining that the customer is not registered for the online access, performing a call-based PIN process to set the PIN.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the disclosure may be combined with one or more features of a different aspect of the disclosure. Moreover, additional features may be recognized in certain embodiments and/or implementations that may not be present in all embodiments or implementations.

DETAILED DESCRIPTION

Referring generally to the figures, systems and methods for proactively prompting and digitally setting personal identification numbers (PINs) associated with payment cards are disclosed. For example, the systems and methods described herein encourage and conveniently allow customers to set PINs for physical payment cards digitally without the need to send a separate PIN mailer including a system-generated PIN. Specifically, online-based and call-based PIN setting processes are triggered by new card actions that utilize customers' online registrations, customers' registered devices, and/or call-based links to allow customers to enter online secure sessions within which the customers are allowed to provide desired PINs and activate physical payment cards for use. The online-based and call-based PIN setting processes each further include various customer authentication steps that ensure that the person attempting to set a PIN and activate a given physical payment card is the customer associated with that physical payment card.

Traditionally, when a customer opens a new account or requests a new physical payment card, a card mailer including the physical payment card and the PIN mailer including the system-generated PIN number are sent separately to the customer. However, by encouraging and allowing customers to set PINs digitally without needing to send the separate PIN mailer, the systems and methods described herein effectively reduce the likelihood of fraud by preventing potential fraudsters from intercepting both the card mailer and the PIN mailer. For example, if a fraudster intercepts both the card mailer and the PIN mailer, the fraudster may be able to access funds within the account associated with the physical payment card and/or perform various transactions using the physical payment card. In these instances, a variety of resources may be required to resolve the fraud event. For example, resolving the fraud event may require a variety of communications between the customer device, the provider institution computing system, and/or a variety of additional computing systems associated with third-party entities, thereby a computational burden on the overall system. Accordingly, the systems and methods described herein beneficially reduce the computational burden placed on the overall system by reducing the likelihood and actual occurrences of these fraud events.

Further, the systems and methods described herein beneficially reduce or eliminate the costs associated with PIN mailers being sent to customers and save customers time that would otherwise be spent going into physical branches to set PINs for physical payment cards, which computationally burdens branch computer systems. Additionally, encouraging and allowing customers to digitally set the PINs eliminates the traditional waiting period that customers have to wait between receiving the card mailer and the PIN mailer, thereby allowing the customers to instantly use the physical payment card upon activation. Furthermore, the systems and methods described herein allow customers to choose desired, personalized PINs, as opposed to receiving a system-generated PIN, and then using additional computational resources to communicate between the customer device and the provider institution computing system to change the system-generated PIN to a desired PIN. The systems and methods described herein beneficially reduce the likelihood that customers forget their PINs (e.g., because they have an affinity toward their desired, personalized PINs that they would not have toward a random system-generated PIN), and thus reduce computational burdens on the system associated with recovering or resetting customer PINs.

As used herein, the term "online-based PIN process" is utilized to signify a PIN setting process that is initiated based on a customer having established online access to an account associated with a new physical payment card. For example, in some instances, the customer may already be registered for online access to the account using login credentials (e.g., a username and a password). In some instances, the customer may additionally or alternatively have a customer device authorized for online access to the account. Accordingly, the term "online-based PIN process" may be utilized to refer to a PIN setting process that is initiated by the customer logging into the account using the login credentials or a provider institution associated with the account pushing a notification to the customer device authorized for the online access.

Further, as used herein, the term "call-based PIN process" is utilized to signify a PIN setting process that is initiated by a request sent to the customer along with the new physical payment card requesting the customer to set the PIN for the new physical payment card by calling a call center associated with the provider. For example, in some instances, the customer may not have established online access. However, the customer may have a phone authorization conducted during a phone call with the call center and be sent a secured link configured to allow the customer to enter a secured session on the customer device to set the PIN based on the phone authorization.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
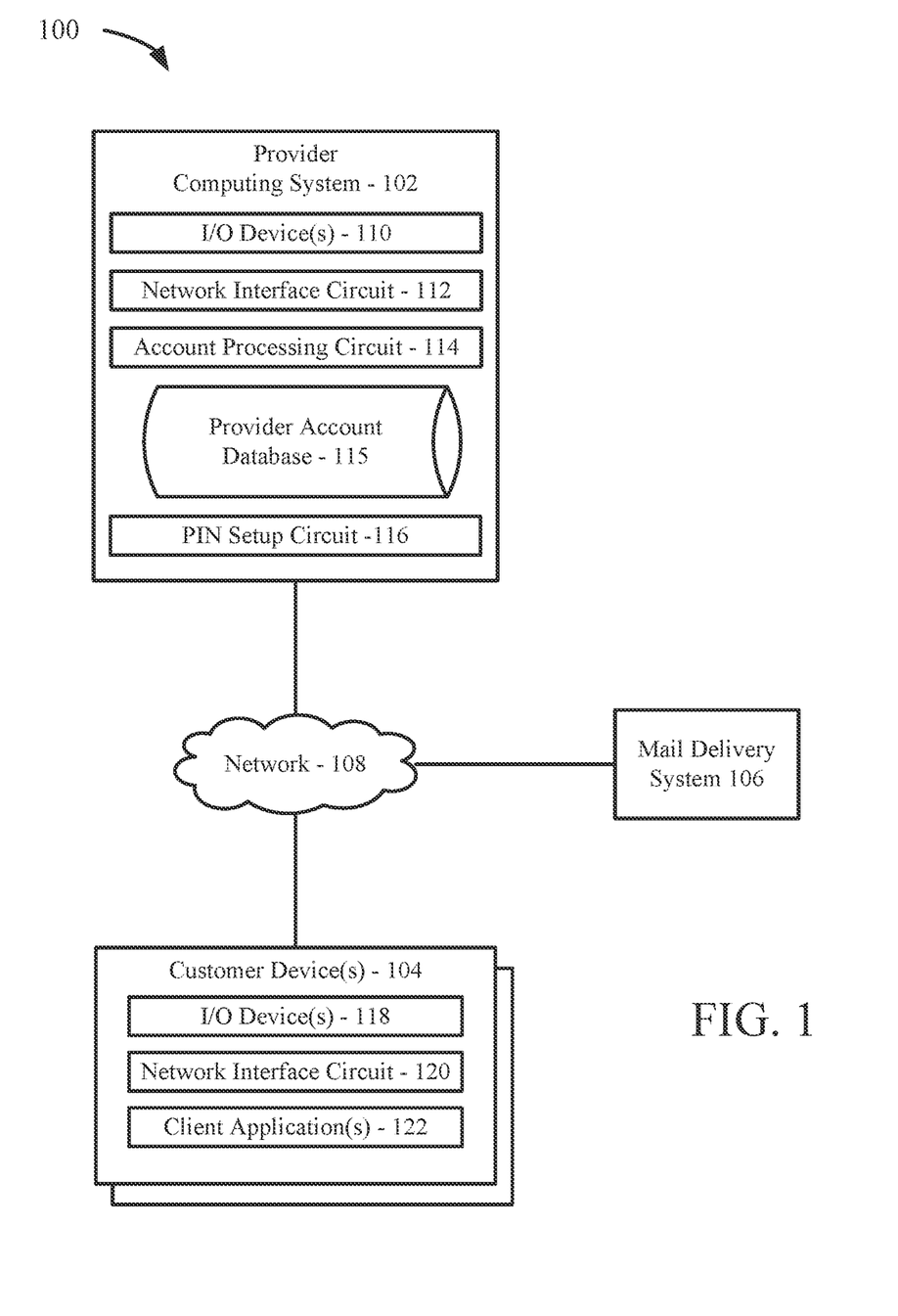
FIG. 1 is a block diagram of a computing environment for proactively prompting and digitally setting personal identification numbers (PINs) associated with payment cards, according to an example embodiment.

FIG. 1 is a diagram of an environment 100 for proactively prompting customers to digitally set personal identification numbers (PINs) associated with payment cards, according to an example embodiment. As shown, the environment 100 includes a provider computing system 102, one or more customer devices 104, and a mail delivery system 106. The one or more customer devices 104 and the provider computing system 102 are in communication with each other and are connected by a network 108.

The provider computing system 102 is owned by, associated with, or otherwise operated by a provider institution (e.g., a bank or other financial institution) that maintains one or more accounts held by various customers (e.g., the customer associated with the customer device 104), such as demand deposit accounts, credit card accounts, receivables accounts, and so on.

In some instances, the provider computing system 102 may comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the provider computing system 102 may comprise and/or have various other devices communicably coupled thereto, such as, for example, desktop or laptop computers (e.g., tablet computers), smartphones, wearable devices (e.g., smartwatches), and/or other suitable devices.

In some embodiments, the provider computing system 102 includes one or more I/O devices 110, a network interface circuit 112, an account processing circuit 114, a provider account database 115, and a PIN setup circuit 116. The one or more I/O devices 110 are configured to receive inputs from and display information to a user. While the term "I/O" is used, it should be understood that the I/O devices 110 may be input-only devices, output-only devices, and/or a combination of input and output devices.

In some instances, the network interface circuit 112 includes, for example, program logic that connects the provider computing system 102 to the network 108. The network interface circuit 112 facilitates secure communications between the provider computing system 102 and the customer device(s) 104. The network interface circuit 112 also facilitates communication with other entities, such as other banks, settlement systems, and so on. The network interface circuit 112 further includes user interface program logic configured to generate and present web pages to users accessing the provider computing system 102 over the network 108.

The account processing circuit 114 is structured or configured to perform a variety of functionalities or operations to enable and monitor various customer activities (e.g., account processing, product registration processing, account monitoring, etc.) in connection with customer account information stored within a provider account database 115. In some instances, the account processing circuit 114 performs various functionalities to enable account opening and/or closing actions, account withdrawals and deposits (e.g., account credits and debits to checking and savings accounts), various customer account tracking activities, and/or a variety of other services associated with and/or provided by the provider.

The provider account database 115 is structured or configured to retrievably store customer account information associated with various customer accounts held or otherwise maintained by the provider institution on behalf of its customers. In some instances, the customer account information includes customer information, account information, and payment card information pertaining to a given customer account and associated payment card.

For example, in some instances, the customer information may include a name, a phone number, an e-mail address, a physical address, etc. of the customer associated with the customer account. In some instances, the account information may include information pertaining to the type and corresponding capabilities of the given account, an online access status associated with the customer account (e.g., an indication of whether the customer has been registered for online access to the customer account), online access information associated with the customer account (e.g., a username, a password, a list of customer devices authorized for online access to the customer account), etc. associated with the customer account. In some instances, the payment card information may include a payment card number, an expiration date, a card verification value (CVV) number, a PIN status (e.g., an indication of whether the payment has an associated PIN), a PIN (e.g., if the PIN has been set), etc. associated with the payment card.

The PIN setup circuit 116 is structured to enable various functionalities described herein. For example, in some instances, the PIN setup circuit 116 is structured to determine whether a PIN has been set for a physical payment card associated with a customer account and whether the customer is registered for online access to the customer account, as described in detail below, with respect to FIG. 2. In some instances, if the PIN setup circuit 116 determines that the customer is registered for online access, the PIN setup circuit 116 is structured to initiate and perform an online-based PIN process, as described in detail below, with respect to FIG. 3. In some instances, if the PIN setup circuit 116 determines that the customer is not registered for online access, the PIN setup circuit 116 is structured to initiate and perform a call-based PIN process, as will be described in detail below, with respect to FIG. 4.

The customer device 104 is owned, operated, controlled, managed, and/or otherwise associated with a customer (e.g., a customer of the provider institution). In some embodiments, the customer device 104 may be or may comprise, for example, a desktop or laptop computer (e.g. a tablet computer), a smartphone, a wearable device (e.g., a smartwatch), a personal digital assistant, and/or any other suitable computing device.

In some embodiments, the customer device 104 includes one or more I/O devices 118, a network interface circuit 120, and one or more client applications 122. While the term "I/O" is used, it should be understood that the I/O devices 118 may be input-only devices, output-only devices, and/or a combination of input and output devices.

In some instances, the I/O devices 118 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 118 further comprise one or more user interfaces (devices or components that interface with the customer), which may include one or more biometric sensors (such as a fingerprint reader, a heart monitor that detects cardiovascular signals, face scanner, an iris scanner, etc.).

The network interface circuit 120 includes, for example, program logic and various devices (e.g., transceivers, etc.) that connect the customer device 104 to the network 108. The network interface circuit 120 facilitates secure communications between the customer device 104 and the provider computing system 102. The network interface circuit 120 also facilitates communication with other entities, such as other banks, settlement systems, and so on.

In some embodiments, the customer device 104 stores in computer memory, and executes ("runs") using one or more processors, various client applications 122, such as an Internet browser presenting websites, text messaging applications, and/or applications provided or authorized by entities implementing or administering any of the computing systems in environment 100.

For example, in some instances, the client applications 122 comprise a customer provider client application (e.g., a financial institution banking application) provided by and at least partly supported by the provider computing system 102. For example, in some instances, the client application 122 coupled to the provider computing system 102 may enable the customer to perform various customer activities (e.g., account management, account opening and/or closing actions, account withdrawals and deposits, account PIN setting, etc.) and/or perform various transactions (e.g., the customer making a mortgage payment, the customer sending funds to a recipient, the customer receiving funds from a sender, etc.) associated with one or more customer financial accounts of the customer held at a provider institution associated with the provider computing system 102 (e.g., account opening and closing operations, fund transfers, etc.).

The mail delivery system 106 is controlled by, managed by, owned by, and/or otherwise associated with a mail delivery entity that is configured to physically create and deliver various "mailers" associated with physical payment cards and corresponding PINs based on instructions received from the provider computing system 102. For example, in some instances, the mail delivery system 106 is configured to physically create and deliver card mailers and PIN mailers. As used herein, the term "card mailer" may be utilized to signify a postage unit including both a new physical payment card and a printed set of card activation instructions. Similarly, as used herein, the term "PIN mailer" may be utilized to signify a printed indication of a system-generated PIN associated with a new physical payment card.

For example, in some instances, the mail delivery system 106 may be connected to or otherwise in communication with a card generation machine configured to generate new physical payment cards. Additionally, the mail delivery system 106 may be connected to or otherwise in communication with a printer configured to print sets of card activation instructions to be sent along with the new physical payment cards. Accordingly, in some instances, in response to instructions received from the provider computing system 102 to physically create and deliver a card mailer, the mail delivery system 106 may generate a new physical payment card using the card generation machine and print a corresponding set of card activation instructions using the printer. Similarly, in some instances, in response to instructions received from the provider computing system 102 to physically create and deliver a PIN mailer, the mail delivery system 106 may print an indication of a system-generated PIN corresponding to a new physical payment card. In these instances, the mail delivery system 106 may then initiate a delivery process to have the card mailer (e.g., including the new physical payment card and the printed set of card activation instructions) and/or the PIN mailer (e.g., the printed indication of the system-generated PIN corresponding to the new physical payment card) delivered to the customer (e.g., via a physical address of the customer such as a street address associated with a residence, workplace, post office box, or other location associated with the customer).

Although depicted as a separate system, in some instances, the mail delivery entity may be provided by the provider institution, such that the provider institution performs both the operations described herein as being performed by the provider computing systems 102 and the operations described herein as being performed by the mail delivery system 106.

In some embodiments, mail delivery system 106 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures.

Although not specifically shown, it will be appreciated that the mail delivery system 106 may include a network interface circuit, various additional databases (e.g., similar to the provider account database 115), an account processing circuit (e.g., similar to the account processing circuit 114), and/or other circuits in the same or similar manner to the other components of environment 100.

With an example structure of the environment 100 being described above, example processes performable by the environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 2:
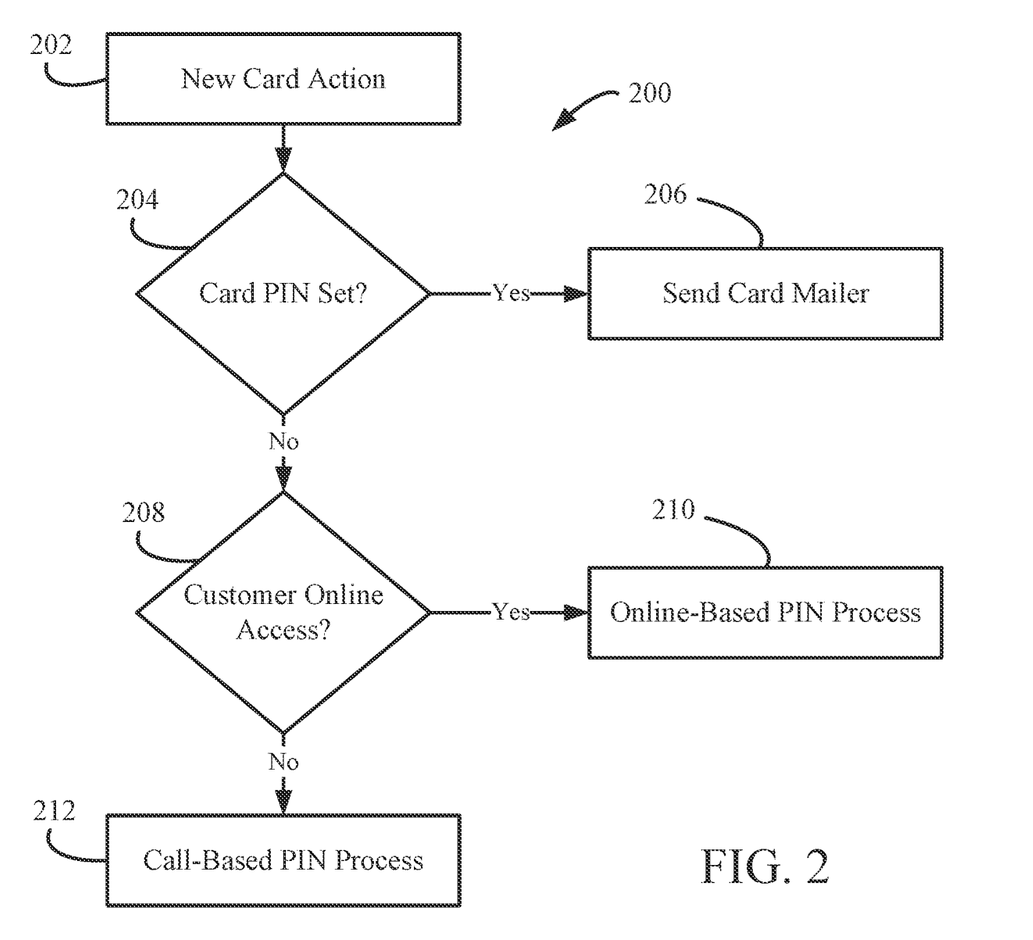
FIG. 2 is flow diagram of a method for ensuring that a PIN is set for a payment card, according to an example embodiment.

Referring now to FIG. 2, a flow diagram of a method 200 for ensuring that a PIN is set for a physical payment card is shown, according to an example embodiment. As shown, the method 200 begins with a new card action occurring, at step 202. In some instances, a new card action may comprise a customer opening a new checking or debit account, a customer requesting a new physical payment card, an expiration of a previous physical payment card, or any other action prompting the provider institution to provide the customer with a new physical payment card.

In some instances, the provider computing system 102 may receive a new card action directly or indirectly from the customer. For example, in some instances, the customer may enter a branch location of the provider institution and may open a new checking or debit account or request a new physical payment card by interacting with a teller at the branch location. In this scenario, the teller may input (e.g., via one or more of the I/O devices 110) various information associated with the customer's opening of the new checking or debit account and/or requested new physical payment card into the provider computing system 102.

In some instances, the customer may open a new checking or debit account or request a new physical payment card via the customer device 104 using a client application 122 (e.g., a provider client application provided to the customer device 104 by the provider computing system 102). In this case, the provider computing system 102 may receive similar information associated with the customer's opening of the new checking or debit account and/or requested new physical payment card from the customer device 104 over the network 108.

In yet some other instances, the provider computing system 102 may automatically identify a new card action based on an expiration or scheduled expiration of a previous physical payment card. For example, in some instances, the provider computing system 102 may determine that a previous physical payment card has expired or is scheduled to expire based on an expiration date of the previous physical payment card stored within the provider account database 115. In this scenario, the provider computing system 102 may automatically identify the expiration or scheduled expiration of the previous physical payment card as a new card action prompting the provider institution to provide the customer with a new physical payment card. In some embodiments, the provider computing system 102 may automatically identify a scheduled expiration of the previous physical payment card and provide the customer with a new physical payment card a threshold time period in advance of the scheduled expiration date (e.g., 1 month, 2 months, 3 months, 4, months, 5 months, etc. in advance).

In any case, upon the new card action occurring, at step 202, the PIN setup circuit 116 may then determine whether the customer has set a PIN for the new physical payment card, at step 204. For example, in some instances, the customer may set a PIN for the new physical payment card as part of the process of opening a new checking or debit account or as part of the process of requesting the new physical payment card. Accordingly, in these instances, the PIN setup circuit 116 may receive the PIN via either the teller entering the PIN into the provider computing system 102 (e.g., via one of the I/O devices 110) or from the customer device 104, depending on whether the customer opens the new checking or debit account or requests the new physical payment card in person at the branch location or using the client application 122. Once the PIN setup circuit 116 receives the PIN, the PIN setup circuit 116 may then store the PIN within the appropriate customer account in the provider account database 115.

Accordingly, when determining whether the customer has set the PIN for the new physical payment card, at step 204, the PIN setup circuit 116 may query the provider account database 115 to determine whether the corresponding customer account associated with the new physical payment card has a PIN stored within the provider account database 115.

If the PIN setup circuit 116 determines that the customer has set the PIN for the new physical payment card, at step 204, the PIN setup circuit 116 may cause a card mailer to be sent to the customer. For example, the PIN setup circuit 116 may transmit instructions to the mail delivery system 106 to physically create and deliver a card mailer including the new physical payment card and a set of card activation instructions to the customer.

Alternatively, if the PIN setup circuit 116 determines that the customer has not set the PIN for the new physical payment card, at step 204, the PIN setup circuit 116 may then determine whether the customer is registered for online access to the account, at step 208. For example, in some instances, the PIN setup circuit 116 may query the provider account database 115 to determine whether the customer has registered for online access to the customer account based on the online access status of the customer account stored within the provider account database 115. If the PIN setup circuit 116 determines that the customer is registered for online access to the account, at step 208, the PIN setup circuit 116 may then perform an online-based PIN process, at step 210, as will be described in detail below, with respect to FIG. 3. Alternatively, if the PIN setup circuit 116 determines that the customer is not registered for online access to the account, at step 208, the PIN setup circuit 116 may then perform a call-based PIN process, at step 212, as will be described in detail below, with respect to FIG. 4.

Figure 3:
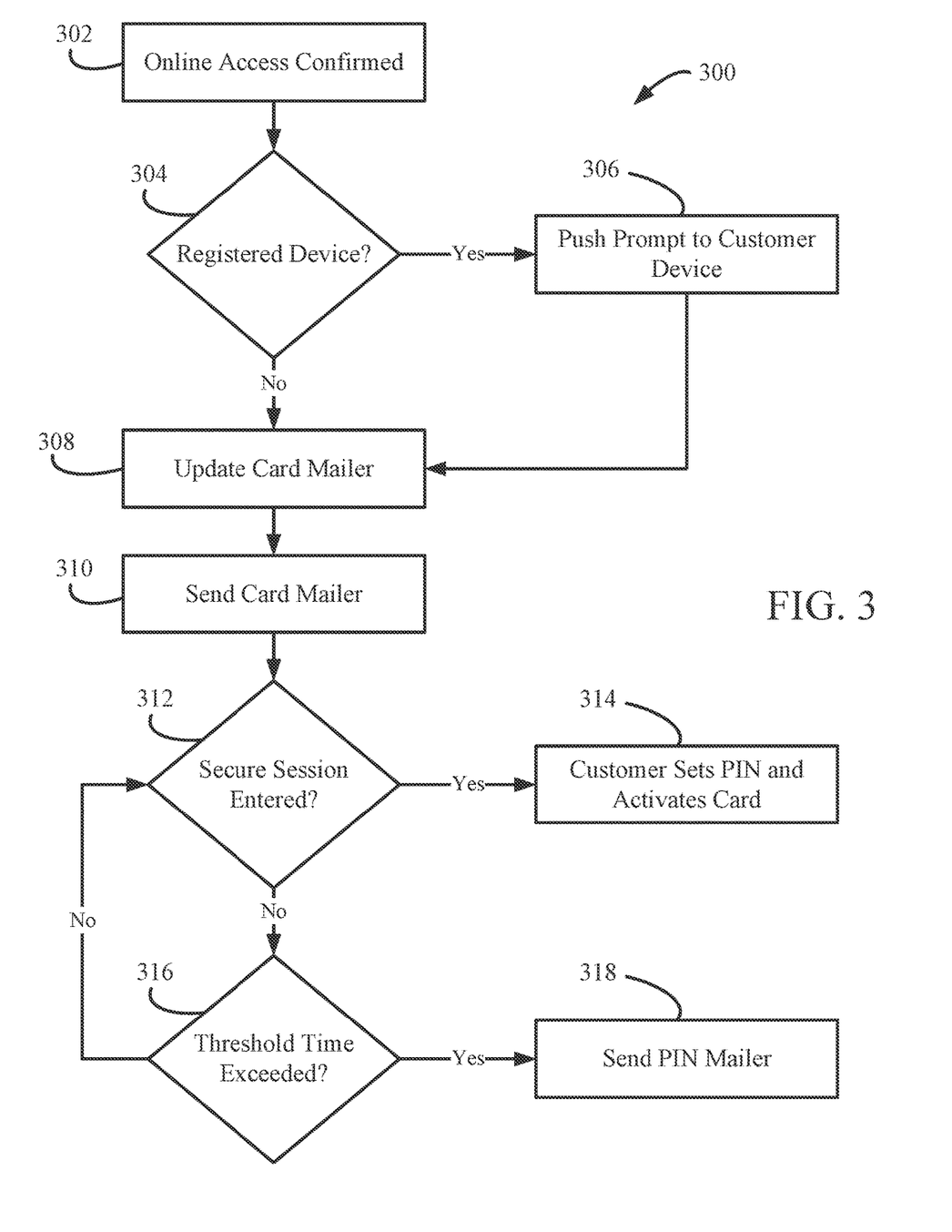
FIG. 3 is a flow diagram of a method for performing an online-based PIN setting process, according to an example embodiment.

Referring now to FIG. 3, a flow diagram of a method 300 for performing an online-based PIN setting process is shown, according to an example embodiment. As shown, the method 300 begins with the customer's online access being confirmed, at step 302. For example, the PIN setup circuit 116 may confirm the customer's online access by querying the provider account database 115, as discussed above, with respect to step 208 of the method 200.

Once the customer's access has been confirmed, at step 302, the PIN setup circuit 116 may then determine whether the customer has a registered customer device that has been authorized for online access to the account, at step 304. For example, in some instances, when the customer requests to open a new account or requests a new physical payment card, the customer may register one or more customer devices as being authorized for online access to the new account or the account associated with the requested new physical payment card. In some instances, registering the one or more customer devices may comprise the customer providing (e.g., via the customer device 104) one or more pieces of authentication information (e.g., a username, a password, a social security number, a pass phrase, an answer to a security question, a date of birth of the customer, a two-factor authentication code, etc.) associated with the customer, a device ID associated with each customer device 104 to be registered, and an indication of an account (e.g., an account number) to which the customer device 104 is to be registered to the provider computing system 102.

As such, the provider computing system 102 may authenticate the customer by comparing the authentication information received from the customer (e.g., from the customer device 104) to customer authentication information of the customer stored within the provider account database 115. Once the provider computing system 102 has authenticated the customer, the provider computing system 102 may then store an indication of authorization for each registered customer device (e.g., including the corresponding device IDs for each customer device) within the appropriate customer account within the provider account database 115.

Accordingly, the PIN setup circuit 116 may determine whether the customer has any registered customer devices authorized for online access to the account, at step 304, by querying the provider account database 115 to determine whether the corresponding account has any indications of authorized registered customer devices.

If the PIN setup circuit 116 determines that the customer has a registered customer device authorized for online access to the account, at step 304, the PIN setup circuit 116 may then transmit a prompt to the customer device 104, at step 306. For example, in some instances, the PIN setup circuit 116 may transmit a push notification to the customer device 104. For example, the push notification may include an indication that a new physical payment card is being delivered to the customer and that the customer has yet to set up a PIN for the physical payment card. The push notification may further include a link configured to automatically open the client application 122 (e.g., a provider client application provided to the customer device 104 by the provider computing system 102) where the customer may enter a secure online session to set the PIN for the physical payment card.

In some instances, the customer may be automatically authenticated to enter the secure online session to set the PIN within the client application 122 by virtue of being able to access the customer device 104 and the client application 122. For example, in some instances, the customer device 104 and/or the client application 122 may require various access credentials to be entered by the customer prior to use (e.g., passwords, passcodes, fingerprint recognition, facial recognition, retinal recognition, etc.). Accordingly, in some instances, the customer may further provide (e.g., via the customer device 104) the provider computing system 102 with an indication of the security protocols in place for the customer device 104 and/or the client application 122 (e.g., during registration of the customer device 104), which may then be stored by the provider computing system 102 within the provider account database 115. As such, in some instances, the PIN setup circuit 116 may query provider account database 115 to determine what security protocols are in place for the registered customer device 104 and whether additional authentication information is needed to allow the customer to enter the secure online session.

In some instances, the customer may further be required to provide additional authentication information to authenticate prior to entering the secure online session within the client application 122. For example, in some instances, the customer may be required to provide a pass phrase and/or a last four digits of the customer's social security number; undergo fingerprint recognition, facial recognition, and/or retinal recognition; or, in the case that the customer has already received the physical payment card (e.g., in some instances, the card mailer may be updated and sent to the customer prior to step 304), provide a last four digits of the physical payment card, a CVV of the physical payment card, and/or an expiration date of the physical payment card.

In any case, in response to the prompt pushed to the customer device 104, the customer may enter a secure online session within the client application 122. Within the secure online session, the customer may set the PIN and activate the physical payment card, as will be discussed below, with respect to step 314. In some instances, if the customer has not received the physical payment card, the customer may be provided with various card information (e.g., a card number, a CVV, an expiration date, etc.) of the physical payment card upon the customer activating the physical payment card to allow for the customer to utilize the card information to perform various transactions ahead of receiving the physical payment card.

For example, in some instances, the customer may utilize the card information obtained via the secure online session to make online transactions prior to receiving the physical payment card (e.g., by entering a card number, a CVV, an expiration date, etc.). In some other instances, the secure online session may include a selectable option to add a virtual payment card corresponding to the physical payment card to a mobile wallet application on the customer device 104 prior to receiving the physical payment card. As such, the customer may make purchases at a variety of physical merchant locations using the customer device 104 by, for example, tapping a near-field communication (NFC) device of the customer device 104 to corresponding NFC devices of corresponding merchant computing systems or brining the devices within a threshold distance of one another to initiate transactions using the payment card.

In some instances, the customer may further be allowed to make automated teller machine (ATM) withdrawals utilizing the virtual payment card and the PIN set within the secure online session. For example, similar to the merchant scenario discussed above, in some instances, the customer may tap the NFC device of the customer device 104 to a corresponding NFC device of an ATM or bring the devices within a threshold distance of one another. Upon tapping the NFC device of the customer device 104 to the corresponding NFC device of the ATM, the ATM may receive the various card information, as well as various authentication information (e.g., a device ID, a cryptogram, a device token) from the customer device 104. The ATM may then prompt the user to enter the PIN set for the payment card (e.g., the PIN set within the secure online session) and, upon entry of the correct PIN, allow the customer to make a cash withdrawal or other transaction (e.g., transfer funds from one account to another, pay a bill, or check a balance of an account) before the customer has actually received the physical payment card.

In some instances, the customer may further be able to register the payment card for various person-to-person transfer services (e.g., Zelle®) by entering the card number, the CVV, the expiration date, etc. into a person-to-person transfer service application downloaded onto the customer device (e.g., one of the client applications 122). As such, in some instances, the customer may be able to use the payment card to make person-to-person transfers to various recipients using the person-to-person transfer service before actually receiving the physical payment card.

If the PIN setup circuit 116 determines that the customer does not have a registered customer device, at step 304, or if the customer does not respond to the prompt pushed to the customer device 104, at step 306, the PIN setup circuit 116 may then update a card mailer to be sent to the customer, at step 308. For example, in some instances, the PIN setup circuit 116 may update the set of card activation instructions to include a scannable code (e.g., a quick response (QR) code) and/or a website address configured to navigate the customer device 104 to a secure online session to set up the PIN for the physical payment card.

Once the card mailer has been updated, at step 308, the PIN setup circuit 116 may then cause the card mailer to be sent or delivered to the customer, at step 310. For example, in some instances, the PIN setup circuit 116 may transmit a request to the mail delivery system 106 to physically create and deliver a card mailer including both the new physical payment card and the updated set of card activation instructions to the customer. In response to receiving the request from the PIN setup circuit 116, the mail delivery system 106 may then physically create and deliver the card mailer to the customer.

Accordingly, in some instances, once the customer has received the card mailer, the customer may scan the scannable code using the customer device 104 or may enter the website address into the customer device 104. In either case, the customer device 104 may navigate to a secure online session where the customer may set the PIN and activate the physical payment card, as will be described below, with respect to step 314. In some instances, the customer may similarly be required to provide any of the various additional authentication information described above to authenticate prior to entering the secure online session.

In some instances, if the customer sets the PIN in response to the push prompt prior to the PIN setup circuit 116 updating the card mailer, at step 308, the updating of the card mailer, at step 308, may be omitted.

After the online access has been confirmed, at step 302, the prompt has been pushed to the customer device 104, at step 306, and/or the card mailer has been updated, at step 308, and sent to the customer, at step 310, the PIN setup circuit 116 may determine whether the customer has entered a secure online session, at step 312. For example, in some instances, the customer may respond to the prompt pushed to the customer device 104 by interacting with the link within the prompt and providing the necessary authentication information to enter the secure online session. Similarly, in some instances, the customer may respond to the sent card mailer by scanning the scannable code and/or navigating to the website address included in the card mailer using the customer device 104 and providing the necessary authentication information to enter the secure online session.

In some instances, the PIN setup circuit 116 may further be configured to automatically prompt the customer to enter the secure online session and set up the PIN for the new physical payment card if the customer logs into the client application 122 or onto an online website of the provider institution (e.g., maintained, managed, or otherwise supported by the provider computing system 102) any time after the new card action, at step 202, after the customer's online access has been confirmed, at step 302, and before a PIN mailer has been sent (as will be discussed below, with respect to step 318). In some instances, the customer may similarly be required to provide any of the additional authentication information discussed above to authenticate themselves prior to entering the secure online session.

In any case, if the PIN setup circuit 116 determines that the customer has entered the secure online session, at step 312, the customer is then allowed to set the PIN and activate the new physical payment card, at step 314. For example, in some instances, the customer device 104 may receive a desired PIN and a request to activate the physical payment card from the customer while the customer device 104 is in the secure online session. Accordingly, the customer device 104 may then transmit the desired PIN and the request to activate the physical payment card to the provider computing system 102. The provider computing system 102 (e.g., the PIN setup circuit 116) may then set the PIN for the physical payment card to the desired PIN and change an activation status of the physical payment card to "active" by updating the corresponding PIN and activation status of the physical payment card stored within the provider account database 115. Once the PIN has been set and the activation status of the physical payment card has been changed to "active," the physical payment card may then be used for transactions.

If the PIN setup circuit 116 determines that the customer has not entered the secure online session, at step 312, the PIN setup circuit 116 then determines whether a threshold time has been exceeded, at step 316. For example, in some instances, various regulatory provisions may require that a PIN be automatically provided to the customer within a predetermined amount of time (e.g., a day, a week, two weeks, a month, two months) from either the new card action or the card mailer being sent to the customer. As such, in some instances, the threshold time may be a day, a predetermined number of days (e.g., between two and six days), a week, a predetermined number of weeks (e.g., between two and four weeks), a month, a predetermined number of months (e.g., between two and eleven months), a year, or any other suitable threshold time. If the PIN setup circuit 116 determines that the threshold time has not been exceeded, at step 316, the PIN setup circuit 116 may again determine whether the customer has entered the secure online session, at step 312, as discussed above.

However, if the PIN setup circuit 116 determines that the threshold time has been exceeded, at step 316, the PIN setup circuit 116 then proceeds to cause a PIN mailer to be sent to the customer, at step 318. For example, in some instances, the PIN setup circuit 116 may generate a PIN for the new physical payment card (e.g., via a random number generation process) and transmit a request to the mail delivery system 106 to physically create and deliver a PIN mailer including a printed indication of the system-generated PIN to the customer. In response to receiving the request from the PIN setup circuit 116, the mail delivery system 106 may then physically create and deliver the PIN mailer to the customer.

It should be appreciated that, in some instances, the only way that the PIN mailer is sent to the customer in the online-based PIN setting process is if the customer does not set the PIN for the physical payment card before the threshold time is exceeded. In these instances, if the customer does set the PIN before the threshold time is exceeded, the PIN mailer is neither created nor delivered to the customer.

In some instances, the customer may log into the secure online session and, instead of providing their own PIN, may choose to have a PIN generated for them. In this case, the system-generated PIN may be presented to the customer via a display of the customer device 104. In this case, the PIN mailer may similarly not be created nor delivered to the customer. However, in this case, the PIN mailer may still be mailed to the customer (e.g., the customer may be able to opt-in to receiving the PIN mailer or it may automatically be sent to the customer if the customer does not opt-out).

In some other instances, the customer may be allowed to affirmatively deny or opt-out of setting their own PIN. For example, in some instances, the customer may log into the secure online session and affirmatively select not to set a PIN. In some other instances, the customer may not be required to log into a secure online session to affirmatively deny or opt-out of setting their PIN. For example, in some instances, a prompt sent from the provider computing system 102 to the customer device 104 may include an interactive button allowing the customer to instantly deny or opt-out of setting their PIN digitally without logging into a secure online session. In either of these instances (e.g., within or outside of the secure online session), the PIN mailer may be sent to the customer prior (e.g., immediately, the next day, within two days, etc.) to the threshold time being exceeded, thereby reducing the time the customer has to wait for the PIN mailer including the system-generated PIN for the payment card.

Figure 4:
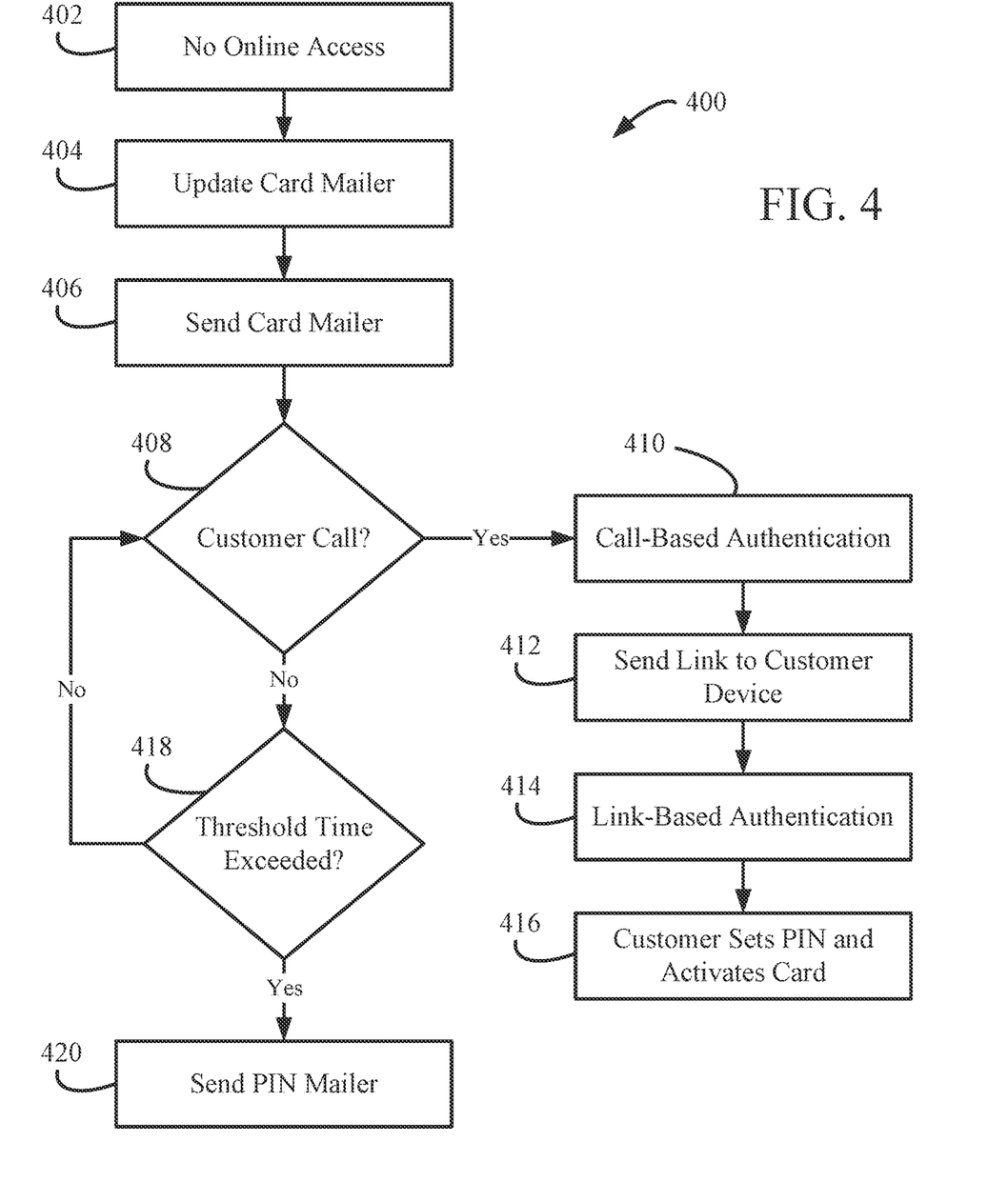
FIG. 4 is a flow diagram of a method for performing a call-based PIN setting process, according to an example embodiment.

Referring now to FIG. 4, a flow diagram of a method 400 for performing a call-based PIN setting process is shown, according to an example embodiment. As shown, the method 400 begins with the PIN setup circuit 116 determining that the customer has no online access, at step 402. For example, the PIN setup circuit 116 may determine that the customer has no online access by querying the provider account database 115, as discussed above, with respect to step 208 of the method 200.

In some instances, the PIN setup circuit 116 may then update the card mailer, at step 404. For example, in some instances, the PIN setup circuit 116 may update the set of card activation instructions to include a telephone number associated with a customer contact center of the provider institution that the customer may contact to have a link sent to the customer device 104, through which the customer may enter a secure online session to set the PIN for the physical payment card.

Once the card mailer has been updated, at step 404, the PIN setup circuit 116 may then cause the card mailer to be sent or delivered to the customer, at step 406, in a similar manner to that discussed above, with respect to step 310.

After the card mailer has been sent to the customer, at step 406, the PIN setup circuit 116 may then determine whether the customer has called to set up the PIN, at step 408. For example, if the customer calls the customer contact center, the customer may be authenticated by a live teller or banker of the provider institution using a call-based authentication process, at step 410.

During the call-based authentication process, the live teller or banker may ask the customer for various customer authentication information. For example, in some instances, the live teller or banker may require the customer to provide a pass phrase, a last four digits of the customer's social security number, a birth date of the customer, a last four digits of the physical payment card, a CVV of the physical payment card, an expiration date of the physical payment card, and/or any other suitable authentication information.

The teller or banker may then enter the customer's verbal responses received over the phone into the provider computing system 102 via one of the I/O devices 110, and the PIN setup circuit 116 may compare the received authentication information against customer information stored within the provider account database 115 associated with the customer's account to authenticate the customer.

Once the customer has been authenticated over the phone, at step 410, the PIN setup circuit 116 is then configured to send a link to the customer device 104 through which the customer may enter a secure online session to set the PIN for the physical payment card, at step 412. For example, in some instances, in response to the customer being authenticated, the PIN setup circuit 116 is configured to automatically send a text including the link to a phone number associated with the customer device that is on file (e.g., stored within the provider account database 115) with the customer's account. In some instances, once the customer has been authenticated, the teller or banker may ask the customer over the phone for an appropriate phone number to which the link should be sent, and the PIN setup circuit 116 may then send the text including the link to the phone number provided by the customer. In some instances, once the customer has been authenticated, the PIN setup circuit 116 is configured to automatically send the text including the link to the phone number that the customer used to contact the customer contact center (e.g., using caller identification). In some instances, the link may additionally or alternatively be sent to the customer via an e-mail sent to an e-mail address that is on file with the customer's account.

In either case, once the customer device 104 has received the text message (or e-mail) including the link, at step 412, the customer may interact with the link to enter a secure online session to set the PIN and activate the card. For example, in some instances, the PIN setup circuit 116 is configured to first authenticate the customer via a link-based authentication, at step 414. In some instances, the PIN setup circuit 116 may require the user to provide various authentication information. For example, in some instances, authentication information required for the link-based authentication may be similar to or the same as the authentication information discussed above, with respect to the call-based authentication. In some instances, the link-based authentication may require additional, different, or less authentication information.

For example, in some instances, the link-based authentication may require various information that are not obtainable over a phone call, such as, for example, fingerprint recognition, facial recognition, retinal scan recognition, uploading of a photograph or identification form, etc. In some instances, a first set of authentication information may be required for the call-based authentication (e.g., authentication information that is obtainable through a verbal communication) and a second set of different authentication information may be required for the link-based authentication (e.g., authentication information that is not obtainable through verbal communication).

In some instances, once the customer has been authenticated using the link-based authentication, the customer is then allowed to enter the secure online session to set the PIN and activate the new physical payment card, at step 416, in a similar manner to that discussed above, with respect to step 314.

While the aforementioned process includes both a call-based authentication process and a link-based authentication process, in some instances, the process may only include one authentication step. For example, in some instances, the call-based authentication, at step 410, may be omitted, and the PIN setup circuit 116 may proceed directly to sending the link to the customer device, at step 412, upon the customer calling the call center. In some other instances, the link-based authentication, at step 414, may be omitted, and the link may be configured to automatically allow the customer to enter the secure online session to set the PIN and activate the new physical payment card, at step 416, after completing the call-based authentication, at step 410.

If the PIN setup circuit 116 determines that the customer has not called to set up the PIN, at step 408, the PIN setup circuit 116 then determines whether the threshold time has been exceeded, at step 418. This threshold time may be the same as the threshold time discussed above, with respect to step 316. If the PIN setup circuit 116 determines that the threshold time has not been exceeded, at step 418, the PIN setup circuit 116 may again determine whether the customer has called to set up the PIN, at step 408, as discussed above.

In some instances, if the PIN setup circuit 116 determines that the customer has not called to set up the PIN, at step 408, and that the threshold time has not been exceeded, at step 418, the PIN setup circuit 116 may be configured to prompt the customer to set the PIN or affirmatively deny or opt out of setting the PIN. For example, in some instances, the PIN setup circuit 116 may call or send a text message to a phone number on file for the customer prompting the customer to call or text the customer contact cent to set the PIN or to affirmatively deny or opt out of setting the PIN. In some instances, upon receiving the call or text, the customer may instantly initiate the call-based PIN setting process described above to set the PIN by continuing the phone call or by responding to the text message and indicating that the customer wishes to set the PIN. In some instances, the customer may similarly be able to instantly deny or opt out of setting the PIN by indicating that they do not wish to set the PIN over the phone or via a responsive text message. If the customer affirmatively denies or opts out of setting the PIN, the PIN mailer may be sent out to the customer prior (e.g., immediately, the next day, within two days, etc.) to the threshold time period expiring.

However, if the PIN setup circuit 116 determines that the threshold time has been exceeded, at step 418, the PIN setup circuit 116 then proceeds to cause a PIN mailer to be sent to the customer, at step 420, as described above, with respect to step 318.

It should be appreciated that, while the call-based PIN setting process is described above in the context of a telephone call with a live human, in some other instances, other types of real-time communications may be utilized and the customer may communicate with either a live human or a virtual teller bot. For example, in some instances, the call-based PIN setting process may be a text-based or other type of instant-chat-based PIN setting process where the customer communicates with either a live human or a virtual teller bot, but which is otherwise the same as the call-based PIN setting process discussed above.

It should be appreciated that, similar to the online-based PIN setting process, in some instances, the only way that the PIN mailer is sent to the customer in the call-based PIN setting process is if the customer does not set the PIN for the physical payment card before the threshold time is exceeded. In these instances, if the customer does set the PIN before the threshold time is exceeded, the PIN mailer is neither created nor delivered to the customer.

In some other instances, the customer may be able to contact (e.g., call or text) the customer call center to affirmatively deny or opt out of setting their own PIN. In these instances, the PIN mailer may be sent (e.g., immediately, the next day, within two days, etc.) to the customer upon the customer denying or opting out of setting their own PIN instead of waiting for the threshold time to expire, thereby reducing the amount of time the customer has to wait to receive the PIN mailer.

It should be appreciated that, although the call-based PIN setting process is shown and described as a separate flow path, in some instances, the call-based PIN setting process may be optionally included as another option in the online-based PIN setting process. For example, even if the customer has online access to the account associated with the new physical payment card, when the PIN setup circuit 116 updates the card mailer, at step 308 of the online-based PIN setting process, the PIN setup circuit 116 could additionally add the same telephone number associated with the customer contact center or the provider institution (e.g., a live teller or a virtual bot generated by the PIN setup circuit 116) could contact the customer (e.g., call or text the phone number on file for the customer) prompting the customer to set the PIN for the physical payment card. Accordingly, in these instances, the customer may similarly perform the call-based PIN setting process, as discussed above with respect to steps 410-416, as an option within the online-based PIN setting process.

It should further be appreciated that the methods described above, with respect to the online-based PIN setting process and the call-based PIN setting process are provided as examples. In other instances, various method steps may be omitted, added, or rearranged, as desired for a given application, without departing from the scope of the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider computing system associated with a provider, the provider computing system comprising:
   one or more processing circuits including one or more processors and one or more memories having instructions stored thereon that, when executed by the one or more processors, cause the one or more processors to:
      receive a new card action from a customer, the new card action prompting the provider to send a new card to the customer;
      determine that a personal identification number (PIN) has not been set for the new card, wherein determining that the PIN has not been set for the new card includes determining that there is no PIN stored within an account associated with the new card;
      in response to determining that the PIN has not been set for the new card, determine whether the customer is registered for online access for the account associated with the new card;
      in response to determining that the customer is registered for the online access, perform an online-based PIN process to set the PIN, wherein performing the online-based PIN process comprises:
         generating a card mailer in which the new card is sent, wherein generating the card mailer comprises adding one of a scannable code or a website address to the card mailer;
         causing the generated card mailer to be sent to the customer;
         receiving a request from a customer device of the customer to enter a secure online session, wherein the request from the customer device to enter the secure online session is received based on the generated card mailer, and wherein the request from the customer device to enter the secure online session is received in response to one of the customer device scanning the scannable code or the customer device accessing the website address;
         receiving a desired PIN from the customer device within the secure online session; and
         setting the PIN for the new card as the desired PIN received from the customer device; and
      in response to determining that the customer is not registered for the online access, perform a call-based PIN process to set the PIN.

2. The provider computing system of claim 1, wherein performing the online-based PIN process further comprises:
   transmitting an authentication request to the customer device;
   receiving authentication information from the customer device in response to the authentication request;
   authenticating the customer based on the authentication information; and
   allowing the customer device to enter the secure online session based on authenticating the customer.

3. The provider computing system of claim 2, wherein the authentication information comprises customer information and one of an expiration date of the new card, a card verification value number, or a last four digits of a card number of the new card.

4. The provider computing system of claim 1, wherein performing the online-based PIN process further comprises:
   determining that the customer device is an authorized device of the account associated with the new card; and
   pushing a prompt to the customer device based on determining that the customer device is the authorized device, the prompt including a PIN request for the customer to provide the desired PIN,
   wherein the request from the customer device to enter the secure online session is received in response to the prompt pushed to the customer device.

5. The provider computing system of claim 1, wherein performing the call-based PIN process comprises:
   generating the card mailer in which the new card is sent, wherein generating the card mailer comprises adding a phone number associated with the provider;
   causing the generated card mailer to be sent to the customer;
   receiving a call from the customer device;
   transmitting a notification to the customer device based on the customer being authenticated during the call, the notification including a link configured to allow the customer to provide a desired PIN via a secure online session;
   receiving the desired PIN from the customer device within the secure online session based on the customer interacting with the link; and
   setting the PIN for the new card as the desired PIN received from the customer device.

6. The provider computing system of claim 5, wherein performing the call-based PIN process further comprises:
   subsequent to transmitting the notification to the customer device, receiving authentication information from the customer device based on the customer interacting with the link;
   performing a secondary authentication of the customer; and
   allowing the customer device to access the secure online session based on the secondary authentication.

7. A computer-implemented method comprising:
   receiving, by a provider computing system associated with a provider, a new card action from a customer, the new card action prompting the provider to send a new card to the customer;
   determining, by the provider computing system, that a personal identification number (PIN) has not been set for the new card, wherein determining that the PIN has not been set for the new card includes determining that there is no PIN stored within an account associated with the new card;
   in response to determining that the PIN has not been set for the new card, determining, by the provider computing system, that the customer is registered for online access for the account associated with the new card; and
   in response to determining that the customer is registered for the online access, performing an online-based PIN process or a call-based PIN process to set the PIN, wherein performing the online-based PIN process comprises:
      generating a card mailer in which the new card is sent, wherein generating the card mailer comprises adding one of a scannable code or a website address to the card mailer;

causing the generated card mailer to be sent to the customer;

receiving a request from a customer device of the customer to enter a secure online session, wherein the request from the customer device to enter the secure online session is received based on the generated card mailer, and wherein the request from the customer device to enter the secure online session is received in response to one of the customer device scanning the scannable code or the customer device accessing the website address;

receiving a desired PIN from the customer device within the secure online session;

setting the PIN for the new card as the desired PIN received from the customer device.

8. The computer-implemented method of claim 7, wherein performing the online-based PIN process further comprises:

transmitting, by the provider computing system, an authentication request to the customer device;

receiving, by the provider computing system, authentication information from the customer device in response to the authentication request;

authenticating, by the provider computing system, the customer based on the authentication information; and allowing, by the provider computing system, the customer device to enter the secure online session based on authenticating the customer.

9. The computer-implemented method of claim 8, wherein the authentication information comprises customer information and one of an expiration date of the new card, a card verification value number, or a last four digits of a card number of the new card.

10. The computer-implemented method of claim 7, wherein performing the online-based PIN process further comprises:

determining, by the provider computing system, that the customer device is an authorized device of the account associated with the new card; and pushing, by the provider computing system, a prompt to the customer device based on determining that the customer device is the authorized device, the prompt including a PIN request for the customer to provide the desired PIN, wherein the request from the customer device to enter the secure online session is received in response to the prompt pushed to the customer device.

11. A computer-implemented method comprising:

receiving, by a provider computing system associated with a provider, a new card action from a customer, the new card action prompting the provider to send a new card to the customer;

determining, by the provider computing system, that a personal identification number (PIN) has not been set for the new card, wherein determining that the PIN has not been set for the new card includes determining that there is no PIN stored within an account associated with the new card;

in response to determining that the PIN has not been set for the new card, determining, by the provider computing system, whether the customer is registered for online access for the account associated with the new card;

in response to determining that the customer is registered for the online access, performing an online-based PIN process to set the PIN, wherein performing the online-based PIN process comprises:

generating a card mailer in which the new card is sent, wherein generating the card mailer comprises adding one of a scannable code or a website address to the card mailer;

causing the generated card mailer to be sent to the customer;

receiving a request from a customer device of the customer to enter a secure online session, wherein the request from the customer device to enter the secure online session is received based on the generated card mailer, and wherein the request from the customer device to enter the secure online session is received in response to one of the customer device scanning the scannable code or the customer device accessing the website address;

receiving a desired PIN from the customer device within the secure online session; and setting the PIN for the new card as the desired PIN received from the customer device; and in response to determining that the customer is not registered for the online access, perform a call-based PIN process to set the PIN.

12. The computer-implemented method of claim 11, wherein performing the call-based PIN process comprises:

generating, by the provider computing system, the card mailer in which the new card is sent, wherein generating the card mailer comprises adding a phone number associated with the provider;

causing, by the provider computing system, the generated card mailer to be sent to the customer;

receiving, by the provider computing system, a call from the customer device;

transmitting, by the provider computing system, a notification to the customer device based on the customer being authenticated during the call, the notification including a link configured to allow the customer to provide a desired PIN via a secure online session;

receiving, by the provider computing system, the desired PIN from the customer device within the secure online session based on the customer interacting with the link; and setting, by the provider computing system, the PIN for the new card as the desired PIN received from the customer device.

13. The computer-implemented method of claim 12, wherein performing the call-based PIN process further comprises:

subsequent to transmitting the notification to the customer device, receiving, by the provider computing system, authentication information from the customer device based on the customer interacting with the link;

performing, by the provider computing system, a secondary authentication of the customer; and allowing, by the provider computing system, the customer device to access the secure online session based on the secondary authentication.

14. The computer-implemented method of claim 13, wherein the authentication information comprises one of an expiration date of the new card, a card verification value number, or a last four digits of a card number of the new card.

* * * * *